United States Patent [19]

Ishida

[11] Patent Number: 4,472,594

[45] Date of Patent: Sep. 18, 1984

[54] METHOD OF INCREASING THE SENSITIVITY OF THEREMOPILE

[75] Inventor: Masaharu Ishida, Kyoto, Japan

[73] Assignee: Horiba, Ltd., Kyoto, Japan

[21] Appl. No.: 413,065

[22] Filed: Aug. 30, 1982

[30] Foreign Application Priority Data

Sep. 23, 1981 [JP] Japan .................................. 56-151114

[51] Int. Cl.³ ........................ H01L 35/34; H01L 37/00
[52] U.S. Cl. .......................................... 136/201; 62/3;
136/203; 136/225; 374/179
[58] Field of Search ............... 136/201, 203, 224, 225;
374/179; 62/3

[56] References Cited

U.S. PATENT DOCUMENTS 2,984,077  5/1961  Gaskill .......................... 136/201 X
4,150,552  4/1979  Altman .......................... 62/467 R
4,320,344  3/1982  Nicholas .......................... 324/451

FOREIGN PATENT DOCUMENTS 1165114  3/1964  Fed. Rep. of Germany ...... 136/225

Primary Examiner—Leland A. Sebastian
Attorney, Agent, or Firm—Wenderoth, Lind & Ponack

[57] ABSTRACT

A heat sensitive portion is cooled when a temperature of an object to be measured is higher than the standard temperature while a heat sensitive portion is heated when a temperature of an object to be measured is lower than the standard temperature by Peltier's effect owing to an electric current passing through a thermopile from the outside. Thus, the sensitivity of a thermopile can be improved with a device which is simple and has an inexpensive construction.

2 Claims, 1 Drawing Figure

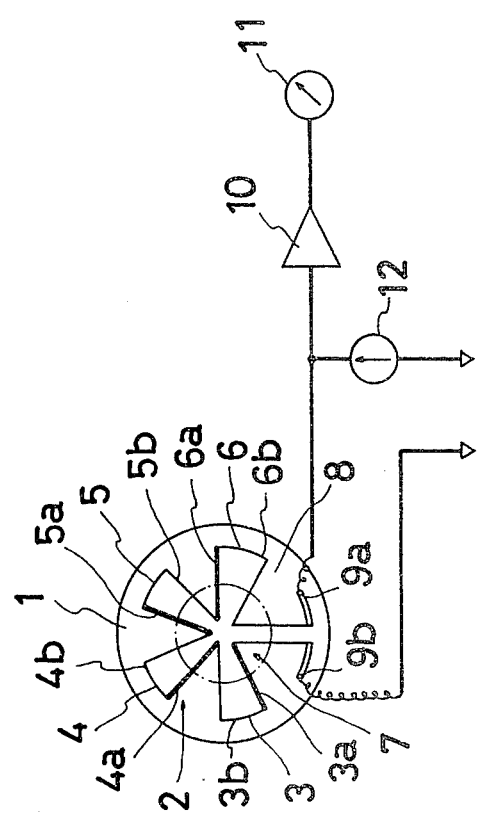

METHOD OF INCREASING THE SENSITIVITY OF THEREMOPILE

BACKGROUND OF THE INVENTION

1. Field of the Invention

The present invention relates to a method of increasing the sensitivity of a thermopile consisting of a plurality of thermocouples connected in series and use for the detection of temperature.

2. Description of the Prior Art

A thermopile, which comprises a heat sensitive portion which is sensitive to heat irradiated from an object to be measured and a standard portion which is maintained at a standard temperature such as room temperature and the like, produces detecting signals resulting from Seebeck's effect owing to temperature differences between the above described two portions. However, when temperatures are measured by means of said thermopile, although they can be accurately measured if the temperature of an object to be measured is sufficiently higher or lower than the standard temperature such as a room temperature, and the like (hereinafter referred to as merely "room temperature"), since comparatively large detecting signals can be obtained, they can not be accurately measured if the temperature of an object to be measured is nearly at room temperature, since only a small detecting signal ca be obtained.

It is necessary to increase the sensitivity of a thermopile itself in order to solve the above described disadvantage. A method, in which a sufficient temperature difference is produced between a heat sensitive portion and the standard portion by cooling or heating said heat sensitive portion by means of the separate cooling element or heating element, can be such a method of increasing the sensitivity of a thermopile (hereinafter referred to as "method of increasing the sensitivity"). However, this method inevitably requires a separate cooling or heating element and thereby requires a thermopile which is large-sized, complicated in construction and expensive.

SUMMARY OF THE INVENTION

Thus, it is an object of the present invention to provide a remarkably useful method of increasing the sensitivity which can increase the sensitivity of a thermopile itself by skillfully utilizing Peltier's effect without using said separate cooling element and the like in view of the fundamental identification of a thermopile with a Peltier element in construction. That is to say, a method of increasing the sensitivity according to the present invention has the point in that a thermopile is electrified from the outside and the resulting Peltier's effect can cool or heat a heat sensitivity portion. The cooling or heating of a heat sensitive portion is determined by the comparison of a temperature of an object to be measured with a room temperature. In short, a heat sensitive portion is cooled when a temperature of an object to be measured is higher than a room temperature while a heat sensitive portion is heated when a temperature of an object to be measured is lower than a room temperature. Thus, heat irradiated from an object to be measured increases a temperature difference of a heat sensitive portion and the sensitivity of the thermopile is thereby increased.

BRIEF DESCRIPTION OF THE DRAWING

The drawing is a general view showing one preferred embodiment of a method according to the present invention.

DESCRIPTION OF THE PREFERRED EMBODIMENT

One preferred embodiment of the present invention will be described below by reference to the drawing. Referring now to the drawing, numeral 1 designates a disc substrate on which a thermopile 2 is mounted. Said thermopile 2 consists of a plurality of thermocouples connected in series, for example four pairs of thermocouples 3, 4, 5, 6 are connected in series in the present preferred embodiment. Each thermocouple consists of different kinds of metallic wires, for example bismuth wire and antimony wire and the like, 3a, 3b, 4a, 4b, 5a, 5b, 6a, 6b, which are connected together. Said thermopile 2 is provided with a blackened layer (a portion encircled by a dotted line as shown in the drawing) having an excellent heat absorption characteristic which serves as a heat sensitive portion at the central portion thereof. Said heat sensitive portion is designated by numeral 7. Furthermore, the outside circumferential portion of said thermopile 2, on which said blackened layer is not formed, is covered with a silicon substrate and the like and serves as the standard portion 8 maintained at a room temperature (one example of the standard temperature).

Elements 9a and 9b are output terminals of said thermopile 2, said output terminals 9a and 9b being connected to a measuring instrument 11 such as an ammeter and the like through an amplifier 10, and said output terminals 9a and 9b are connected to a power source 12 for feeding power to said thermopile 2. Since said thermopile 2 consists of a plurality of thermocouples connected in series, said heat sensitive portion 7 is cooled or heated while said standard portion 8 is heated or cooled owing to Peltier's effect developed by electrifying said thermopile 2 by said power source 12. Either said heat sensitive portion 7 is cooled or heated is dependent upon the direction of electric current from said power source 12 and the kind of said metallic wires 3a, 3b - - - composing said thermopile 2. It is, therefore, only necessary to select the direction of electric current so as to cool said heat sensitive portion when measuring the temperature of an object to be measured whose temperature is, higher than a room temperature said temperature being measured by means of the specified thermopile. On the other hand, it is only necessary to select the direction of electric current so as to heat said heat sensitive portion when to measuring the temperature of an object to be measured whose temperature is lower than a room temperature said temperature being measured by means of the specified thermopile.

Next, the behavior of measuring a temperature of an object to be measured under the condition that a thermopile is electrified to develop Peltier's effect as described above will be compared with the behavior of measuring a temperature of an object to be measured under the conventional operating condition that a thermopile is not electrified. On the assumption that a room temperature is Td and a temperature of an object to be measured is T, in case of a thermopile not being eletrified, the thermal energy $\phi_1$ incident upon said heat sensitive portion 7 is expressed by the following Boltzmann's quadruplication law:

$$\phi_1 = \delta(T^4 - Td^4) \quad (1)$$

wherein $\delta$ is a constant.

On the contrary, in case of an electrified thermopile, the thermal energy $\phi_2$ is expressed by the following equation since said heat sensitive portion 7 is cooled or heated owing to Peltier's effect:

$$\phi_2 = \delta\{T^4 - Td^4(1 - I_B PabZ)^4\} \quad (2)$$

wherein $(-I_B)$ is an electric current passing through a thermopile of which direction is selected to cool said heat sensitive portion 7 when a temperature of an object to be measured is higher than a room temperature while it is selected so as to heat said heat sensitive portion 7 when a temperature of an object to be measured is lower than a room temperature. In addition, Pab is Peltier's coefficient and Z is its thermal impedance. If the value of $I_B$ in the above described equation (2) is suitably selected, $I_B PabZ$ can be smaller than 1 and thereby $(1 - I_B PabZ)$ takes a value between 0 and 1, always satisfying the condition that $\phi_1$ is smaller than $\phi_2$. It is found from the above described relationship that $\phi_1$ is smaller than $\phi_2$ such that an electrified thermopile can give a detecting signal which is larger than that of a non electrified thermopile since in general, the magnitude of detecting signals is in proportion to an incident energy so far as the difference between a room temperature and a temperature of an object to be measured is constant. Accordingly, a small difference between a room temperature and a temperature of an object to be measured can be measured with a good sensitivity by means of a thermopile which has been electrified to develop Peltier's effect although it can not be measured by means of a thermopile which has not been electrified. That is to say, a thermopile is sensitized by Peltier's effect owing to an electric current passing therethrough.

As described above, a method of the present invention can cool or heat a heat sensitive portion by Peltier's effect owing to an electric current passing a thermopile from the outside and thereby sensitize said thermopile itself. Thus, a method of the present invention has the following effects:

(1) Even a temperature of an object to be measured, which is nearly the standard temperature such as a room temperature and the like, can be measured with a good sensitivity by means of a method of the present invention.

(2) The separate cooling element and heating element are not required and thereby a thermopile does not become bulky, being simple in construction, and being inexpensive in manufacture since a thermopile itself is electrified in order to sensitize it. In addition, a method of the present invention can also be practised by merely connecting the already used thermopiles to a power source.

What is claimed is:

1. A method of sensitizing a thermopile which is to be used for measuring the temperature of an object, comprising cooling or heating a heat sensitive portion by Peltier's effect, said heating or cooling effected by passing an externally generated electric current through said thermopile in a direction which is dependent upon whether heating or cooling is to be effected, wherein said heat sensitive portion is heated or cooled in dependence upon the relationship between the temperature of said object whose temperature is to be measured and a standard temperature.

2. A method as in claim 1, wherein said heat sensitive portion is cooled when the temperature of said object is higher than said standard temperature and said heat sensitive portion is heated when the termperature of said object is lower than said standard temperature.

* * * * *